United States Patent [19]
Ahmed et al.

[11] Patent Number: 4,856,172
[45] Date of Patent: Aug. 15, 1989

[54] METHOD FOR THE STRAIN-FREE MOUNTING OF OPTICAL COMPONENTS

[75] Inventors: Nazeer Ahmed, Palos Verdes Estates; Roger R. Tomlinson, La Palma, both of Calif.

[73] Assignee: Hughes Aircraft Company, Los Angeles, Calif.

[21] Appl. No.: 169,916

[22] Filed: Mar. 18, 1988

[51] Int. Cl.$^4$ ............................................... B23P 11/00
[52] U.S. Cl. ........................................... 29/434; 29/469
[58] Field of Search ..................... 29/434, 469; 384/9, 384/25, 26, 50, 54, 56, 58, 91, 445, 548, 557, 627; 72/89.2

[56] References Cited

U.S. PATENT DOCUMENTS

| | | | |
|---|---|---|---|
| 3,452,175 | 6/1969 | Wilkes | 384/50 X |
| 3,452,309 | 6/1969 | Wilkes | 384/50 X |
| 3,471,668 | 10/1969 | Wilkes | 384/50 X |
| 3,552,805 | 1/1971 | Dunlap | 384/58 X |
| 3,643,048 | 2/1972 | Crow et al. | 384/50 X |
| 3,730,007 | 5/1973 | Wellington | 74/89.2 |
| 3,787,937 | 1/1974 | Palac | 29/25.13 |
| 3,932,045 | 1/1976 | Hillberry et al. | 384/50 X |
| 3,971,490 | 7/1976 | Conger | 445/45 X |
| 4,100,451 | 7/1978 | Palac | 445/45 |
| 4,505,464 | 3/1985 | Chitayat | 384/50 X |
| 4,514,016 | 4/1985 | Davis | 403/291 X |
| 4,776,822 | 10/1988 | Dougherty et al. | 29/464 X |

Primary Examiner—Mark Rosenbaum
Assistant Examiner—Frances Chin
Attorney, Agent, or Firm—K. J. Powell; W. J. Streeter; A. W. Karambelas

[57] ABSTRACT

A method is disclosed for the strain-free mounting of a component, such as a mirror, in a manner that allows differential thermal expansion or contraction to take place without distortion of the component. The mounting method makes use of a linear bearing that is rigid in all directions except one. Such a linear bearing is used at two or more points of support on the circumference of a mounting circle or circles. Relative motion in the linear bearings occurs along a line which is an extension of a radius of the mounting circle. The linear bearings each contain two sets of opposed rolamite mechanisms moving in parallel directions in the perpendicular arms of a "Y"-shaped frame. One of the two cylinders in each of the four rolamite clusters in annular and accepts a roller-bearing mounted shaft, and the four shafts are then rigidly attached to a second frame that rides within the first frame; the rolamite bearing motion occurring between the "Y"-shaped first frame and the second frame, the component being mounted on either frame.

5 Claims, 5 Drawing Sheets

METHOD FOR THE STRAIN-FREE MOUNTING OF OPTICAL COMPONENTS

BACKGROUND OF THE INVENTION

This application is related to a copending application Ser. No. 170,525, filed Mar. 21, 1988 entitled "Apparatus For Strain-Free Mounting of Optical Components", Roger R. Tomlinson and Nazeer Ahmed.

1. Field Of The Invention

The present invention relates to a method for the strain-free mounting of a component to a base. In particular, the present invention relates to the strain-free mounting of optical components, such as mirrors, in optical systems and laser systems that are subjected to temperature changes.

2. Description Of The Technology

The mounting of optical components in a way that avoids distortion or actual damage of the component due to thermally induced stresses has been a vexing problem for many years. Mirrors, for example, are commonly fabricated of materials which have a low coefficient of thermal expansion and, often, are required to be mounted on platforms or stages which are made of metals which typically have a high coefficient of expansion.

If the mirror were to be rigidly mounted to the platform, a temperature related expansion or contraction of the mirror and platform would build up structural forces and torques on the mirror that would deform or even permanently damage it. The need for precise control over the surface figure of a mirror used as part of an optical system precludes the acceptance of even relatively small deformations, and the expense of fabricating a large mirror makes the prospect of its being damaged very undesireable. Similar considerations apply to other types of optical applications, such as where the aimpoint of a laser must be critically controlled.

At present there are two commonly employed methods of mounting a mirror to avoid the effects of mechanical stresses that arise from such differences in coefficients of expansion. One is the ball and socket arrangement shown in FIG. 1a. The ball is free to move in a cylindrical bore which constrains the motion to the axis of the cylinder. A second mounting point is a rigid attachment which remains fixed, and the arrangement at the third point of support allows planar motion with two degrees of translational freedom. This method suffers from the drawback that the ball and socket must be preloaded to maintain the stiffness of the mounting. Such preloading increases friction between the ball and socket, and the mirror undergoes considerable distortion due to residual friction and torque.

A second conventional method of mounting a mirror is shown in FIG. 1b. Three bearing points on a metallic base (points A, B and C) are connected to three bearing points (E, F and D) on the mirror by means of rods which have substantially identical thermal expansion characteristics. Uniform heating or cooling of the mirror and the base results in equal amounts of length change for the rods and of angular displacement allowed by the bearings. As the temperature of the mirror and the base changes, the rods connected between CD, CF, BF, BE, AE and AD expand or contract and the rods connected between CD, CF, BF, BE, AE and AD rotate at the joints A, B, C, D, and F. Each of the joints must be preloaded to provide the required stiffness for the mirror mount. However, such preloading increases the friction at the joints which in turn induces a strain related deformation upon the mirror surface.

Stiffness of the bearings is required to satisfy line-of-sight stability requirements for electro-optical sensor and laser systems. Neither of the two prior art methods described above is satisfactory because of the unavoidable strains induced within the component being mounted, the strains due to this requisite stiffness of the mounting bearings and the inherent residual friction.

A problem closely related to the difficulty of making strain-free mounts in an environment of changing temperature is the problem of finding a suitable type of bearing to use in the mounting arrangement. Bearings are highly developed in the art, the goal being to reduce to a minimum the friction associated with the bearing surfaces. Commonly used antifriction bearings employ balls running in races, or cylindrical or conical rollers operating between races. Since there is some amount of rubbing in such bearings due to deflections under load, lubrication is typically required to ensure a reasonable bearing life. However, lubrication causes problems, especially in those installations designed to operate at one extreme of temperature or the other. At very high temperatures lubricants tend to vaporize, and at very low temperatures lubricants tend to become too viscous, or even to solidify. For some applications the bearings are intended to operate in a vacuum. The absence of atmospheric pressure gives rise to further difficulties. For example, evaporation of the lubricant and subsequent lubricant condensation may contaminate crucial optical surfaces, such as the mirror itself.

SUMMARY OF THE INVENTION

The foregoing problems are overcome and other advantages are realized, in accordance with the invention, by methods for mounting an optical component, such as a mirror, to a base such that changes in temperature do not induce mechanical stresses that physically distort the component.

In an illustrative embodiment of the invention, the optical component is mounted at two or more points on a mounting circle or on concentric mounting circles by means of a low-friction linear bearing which permits translational movement in only one preferred direction. The linear bearing is comprised of pairs of rolamite cluster mechanisms housed in a "Y"-shaped frame, such that the roller axes make an angle of ninety degrees with respect to one another. This arrangement ensures translational and rotational rigidity in all but one axis. Roller bearing shafts couple a cylinder in each rolamite cluster to a second frame member that slides longitudinally with respect to the "Y"-shaped frame. This arrangement results in minimal loading on the roller bearings since each is enclosed by an annular cylinder whose periphery has more than 180 degrees of contact with a metal band that forms part of each rolamite mechanism. As temperature changes cause differing amounts of thermal expansion or contraction between the components, the induced deformational stresses are relieved by the relative movement allowed between the mirror and a mounting platform by the linear bearings at their mounting locations.

It is therefore an object of the present invention to provide a method for the strain-free mounting of one structure on another, where the strains arise because of differential thermal expansion or contraction between dissimilar materials.

It is another object of the present invention to provide a method of mounting an optical component on a support structure in such a manner that there are no radial or tangential strains on the component, and its mounting is stiff in all directions, except for the allowance of "breathing"-type expansion or contraction that is compensated for by motion in the support bearings along a single preferred translational axis.

It is a further object of the present invention to provide a method of mounting an optical component on a support structure with a simple type of linear bearing which has minimal friction and yet is highly resistant to movement except for translation in one preferred direction, i.e., rigid in all directions except one.

It is still another object of the present invention to provide a method of mounting a component on a supporting structure with a simple type of low-friction linear bearing which is stiff in all but one preferred direction which may be advantageously employed in applications where precisely controlled movement of instruments or machine tools is required, such as in surgical procedures, parts fabrication, metal cutting, and a large number of other applications.

It is yet another object of the present invention to provide a method of mounting an optical component on a supporting structure with a simple type of linear bearing which is rigid in all directions except one and which requires a minimal amount of lubrication such that temperature related problems associated with lubricants or problems associated with optical contamination by lubricant vapors are eliminated.

Another object of the present invention is to provide a method of mounting a mirror to a base in a manner that precludes the formation of thermally induced mechanical strains that would distort the surface figure of the mirror and degrade its performance in an optical system.

Finally, it is an object of the present invention to provide a method of mounting lasers that must be aimed precisely in spite of the deleterious effects of thermal expansion or contraction.

BRIEF DESCRIPTION OF THE DRAWINGS

An appreciation of other aims and objects of the present invention and a more complete and comprehensive understanding of this invention may be achieved by studying the following description of a preferred embodiment and by referring to the accompanying drawings, wherein.

DESCRIPTION OF A PREFERRED EMBODIMENT

Figure 1A:
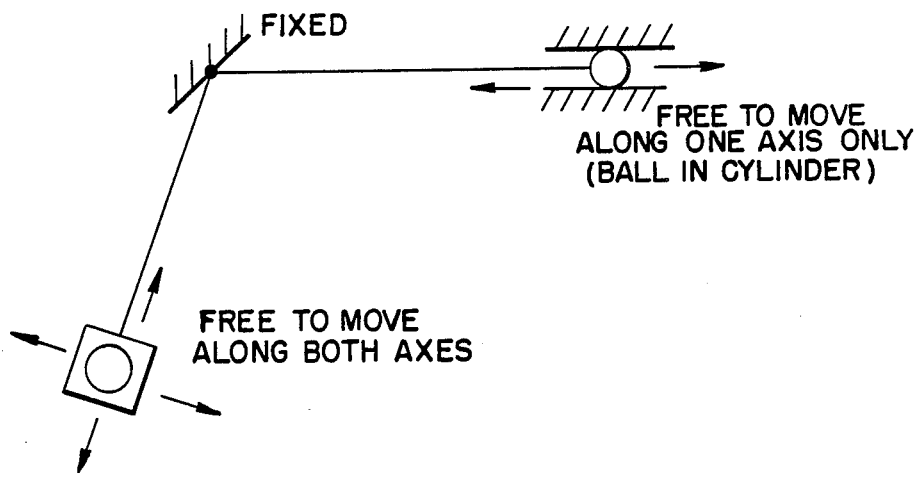
FIG. 1a is a schematic diagram of the ball-in-cylinder apparatus used in the prior art to avoid the effects of differential thermal expansion in mounting a large mirror.
Figure 1B:
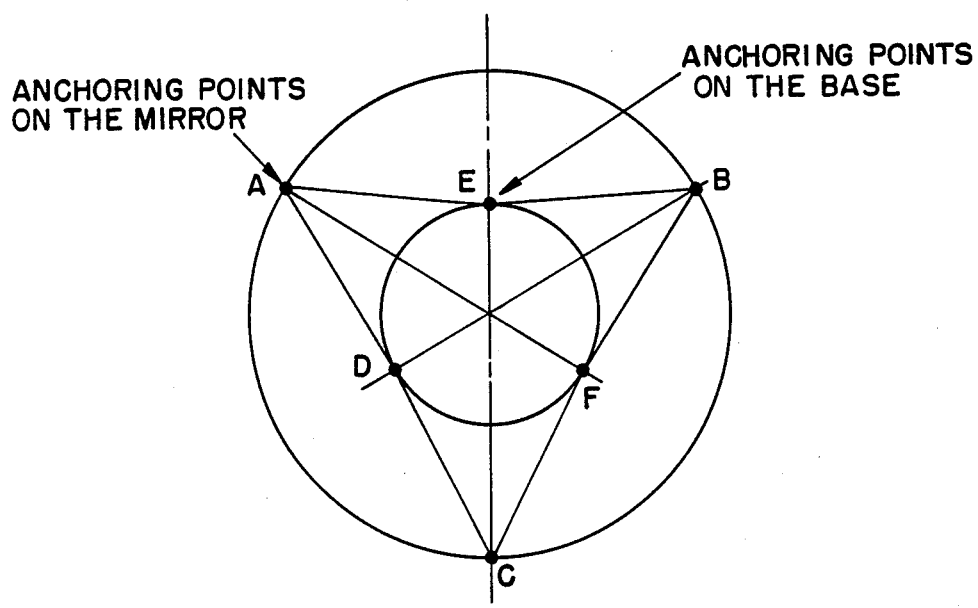
FIG. 1b is a schematic top view of a mirror mounted on a base according to a method in the prior art, with bearing at points A, B and C of the mirror and at points D, E and F of the base.
Figure 2:
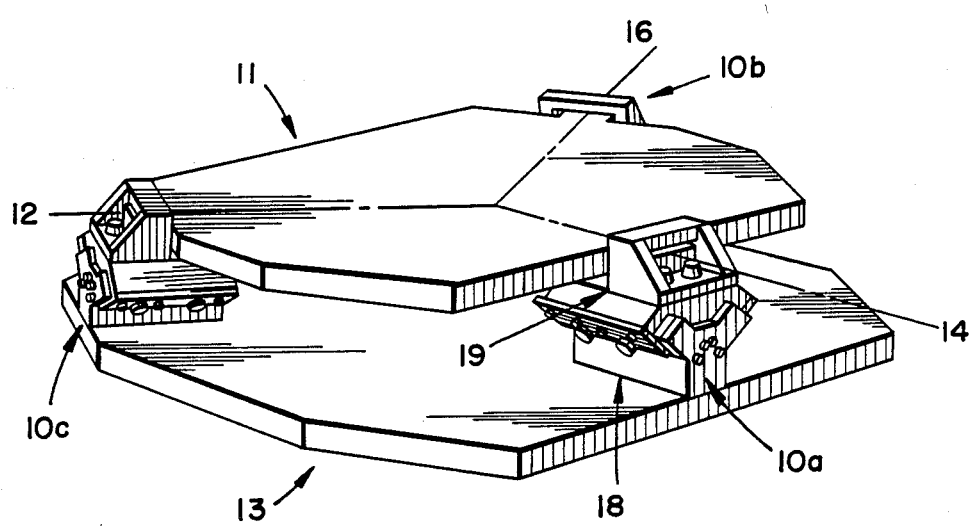
FIG. 2 is a schematic drawing of the mounting of a mirror according to the present invention using three linear bearings.

Referring to FIG. 2, a preferred embodiment of the present invention may be seen which utilizes three linear bearings 10a, 10b and 10c, also referred to herein collectively as linear bearings 10, placed at predetermined points upon the circumference of a mounting circle or mounting circles to support a mirror 11 upon a base platform 13. The linear bearings 10 are oriented in a manner which precludes the development of mechanical strains due to differential expansion or contraction of dissimilar materials in the mirror 11 and platform 13 due to changes in temperature. The linear bearings 10 allow relative motion between the mirror 11 and platform 13 along the three axis labelled 12, 14 and 16, which are extensions of radii of a mounting circle. Each linear bearing, such as 10a, has a "Y"-shaped first frame part 18 and a second frame part 19 attached to the platform 13 and mirror 11, respectively.

In the embodiment as shown in FIG. 2 the mirror 11 may be comprised of a material having a low thermal coefficient of expansion, such as glass, while the platform 13 may be comprised of a material having a high thermal coefficient of expansion, such as Beryllium or aluminum. In order to alleviate the mechanical stresses which the mirror 11 would be subjected to if it were rigidly mounted to the platform 13 and the ambient temperature varied, the linear bearings utilized in the present invention instead cause the mirror to "float" upon the supporting bearings 10. The linear bearings 10 provide for freedom of linear movement along each of their respective axis 12, 14 or 16 while restraining movement, that is, providing a requisite stiffness, along the two axes perpendicular to these axis. Rotational movement is constrained along all three axes associated with each bearing 10.

Figure 3A:
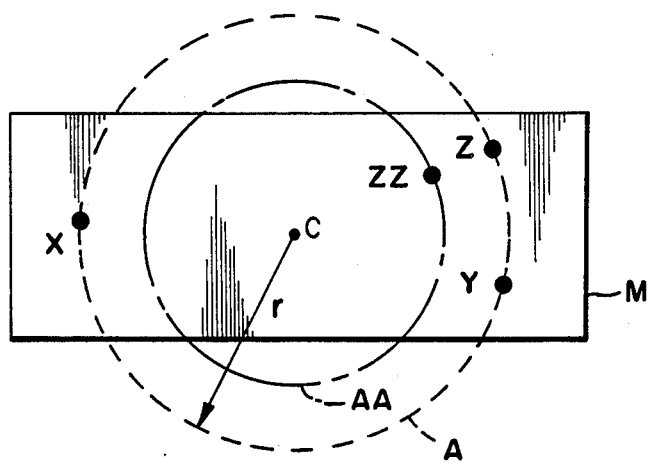
FIG. 3a shows a circle used to determine the location of the three points X, Y and Z at which the linear bearings are mounted as in FIG. 2.

In FIG. 3a a diagram of a mounting circle for a mirror M is shown which, in accordance with the invention, has mounting points X, Y and Z indicated by dots lying on the circumference A of a mounting circle having a center C. As may be appreciated, such a mounting circle may be comprised of two or more concentric circles, such as the circle having a circumference of AA. If two or more mounting circles are employed one or more of the mounting points, such as ZZ, is placed on one of the circles while the other mounting points are placed on one or more of the other mounting circles. It should be realized that more than three mounting points and, hence, linear bearings may be employed.

Figure 3B:
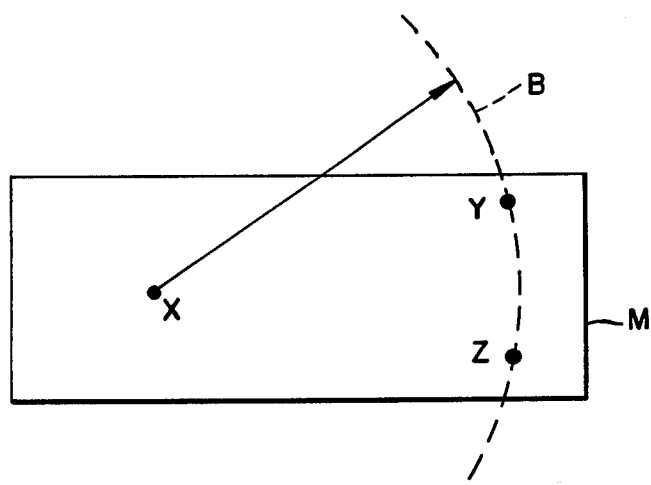
FIG. 3b shows an alternative method of drawing a mounting circle, with the center of the circle denoting a point at which the mirror is fixed to the base, and the points Y and Z denoting points at which two of the linear bearings are mounted.

In FIG. 3b an alternative embodiment of the mounting method of the invention is depicted, with the mirror M being rigidly fixed to the base at the point marked X and two linear bearings being used to support the mirror at the points labelled Y and Z, which are points on the circumference B of a mounting circle having a center at the point X.

It should be realized that more than two mounting points and, hence, linear bearings may be employed in such a mounting method as shown in FIG. 3b. It should also be realized that the linear bearings may be deployed upon the circumferences of a plurality of concentric mounting circles having a common center of X. The choice of mounting points and the number of such points is typically application specific and is related to such factors as the weight of the mirror, the surface area of the mirror and other such factors.

Figure 4:
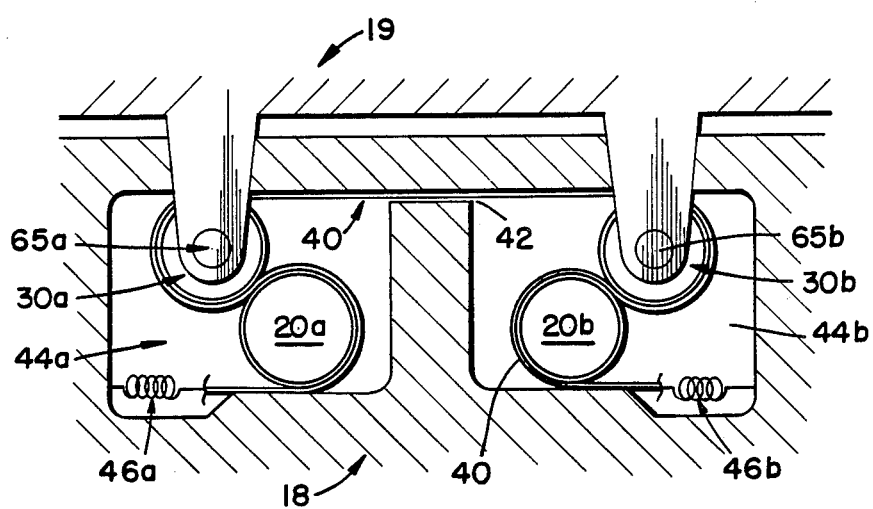
FIG. 4 is a side view of the pair of rolamite mechanisms that move in an opening in one of the upper arms of a "Y"-shaped frame in accordance with the present invention.

Referring now to FIG. 4, there is shown a side view of part of the "Y"-shaped frame of 18 of the linear bearing 10 of the present invention. Two solid cylindrical rollers 20a and 20b and two annular cylindrical roller bearings 30a and 30b are each held in place by the tension in a flexible band 40 which passes through a narrow slot 42 between openings 44a and 44b. The tension in the flexible band 40 is maintained by fixing means at extreme ends of the band, and is indicated schematically as being provided by springs 46a and 46b.

Roller bearings 30 rotate upon shafts 65a and 65b, which also serve to couple the rollers 30 to the second frame part 19.

As may be appreciated, such a structure is known in the art as a rolamite mechanism. In such a mechanism, the cylindrical rollers separated by the flexible band are constrained to move between parallel surfaces separated by a distance which is less than the sum of the diameters of the cylinders. The tension in the band urges the cylinders together and prevents the cylinders from slipping, such that each moves with only a negligible amount of rolling friction. In addition to separating the two rollers, the band also has a strong tendency to maintain the two rollers in alignment one to another. Since such a mechanism operates with relatively low band tension, there is an amount of compliance in the tangent zones proximate to the two rollers that allows rolling over small imperfections such as particulate contamination.

Because of the nature of the rolling process in such a rolamite mechanism, lubrication is not essential to the successful operation of the bearing. Conventional roller bearings experience contact pressures of the order of 100,000 psi in the contact zone, such high contact pressures producing a large amount of friction which, in turn, induces strain in a mirror mounted on such bearings. A rolamite mechanism, by contrast, operates very well down into the region of contact pressures of several hundred psi. Such rolamite mechanisms employed as bearings within a mirror mount, in accordance with the apparatus and method of the invention, ensure that the mirror will be substantially strain-free because any residual friction is rolling friction which is essentially negligible.

The self-alignment tendency of the rolamite mechanism makes it possible for it to successfully resist side loads independent of the proportions of the roller. The wider the roller, the better the self-alignment tendency, the bearings being made as wide as desired.

The width of the rollers also makes such a mechanism resistant to translational or rotational movement along any axis but the axis perpendicular to a plane normal to the contact zone between the two rollers.

Figure 5:
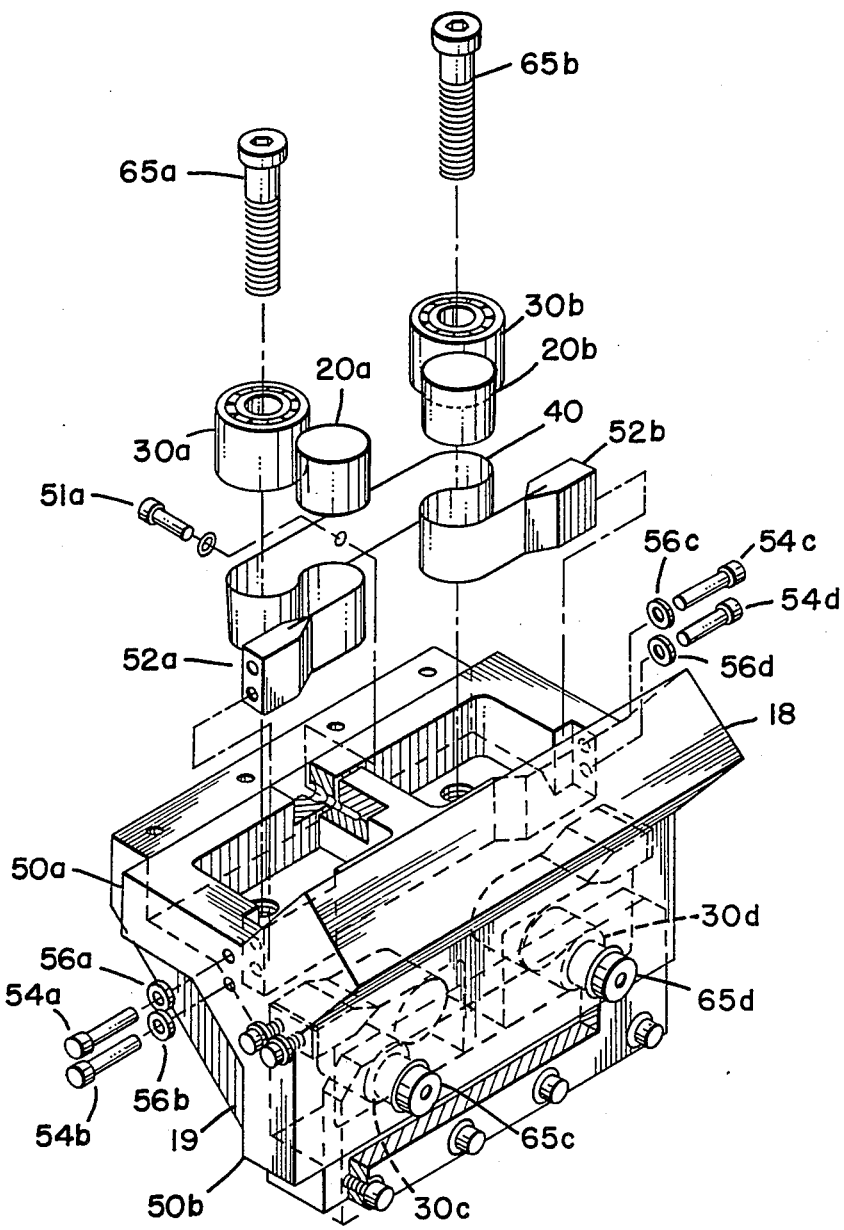
FIG. 5 shows an exploded view of the "Y"-shaped frame of the present invention illustrating how pairs of rolamite mechanisms are arranged in opposite arms of the "Y"-shaped frame.

An exploded view of the generally "Y"-shaped frame 18 of the linear bearing of the present invention is shown in FIG. 5. In the view of FIG. 5, the linear bearing 10a of FIG. 2 has been rotated 135 degrees in a counterclockwise direction to facilitate the illustration of the various components contained therein. Two arms 50a and 50b of the "Y" are disposed at some angle, such as ninety degrees, to each other. Each arm 50 contains a hollow chamber region containing a flexible band 40 which is fixed at its center part to the frame 18 and also at its ends. In the embodiment pictured the center part of each of the flexible bands 40a and 40b is fixed by means of bolts 51a and 51b (only 51a is shown), and the ends are constrained by end clamping pieces 52a and 52b which in turn are attached to frame 18 with tensioning screws 54a, 54b, 54c and 54d. The tension in the "S"-shaped portions of the flexible band is adjusted by how tightly the tensioning screws 54a, b, c, d are screwed against a compression spring member, such as Belleville spring washers 56a, b, c and d, into threaded holes in the end clamping pieces 52. Each "S"-shaped portion of the flexible band 40 holds a pair of cylindrical rollers 20 and 30 which are solid and annular, respectively. The annular cylindrical roller bearings 30a and 30b through whose open central portions shafts 65a and 65b are inserted to connect each roller cluster to the second frame part 19 that fits into the region between arms 50a and 50b. Frame part 19 carries the roller clusters with it as it moves with respect to the "Y"-shaped frame 18. The cylindrical rollers 20 and 30 serve to change the position of the "S"-shaped flexures in the flexible band 40.

It should be realized that in other, unillustrated, embodiments of the invention that a single pair of rolamite rollers may be employed with each of the arms, the flexible band being fixed at one end and constrained by a tensioning means at the other.

Figure 6:
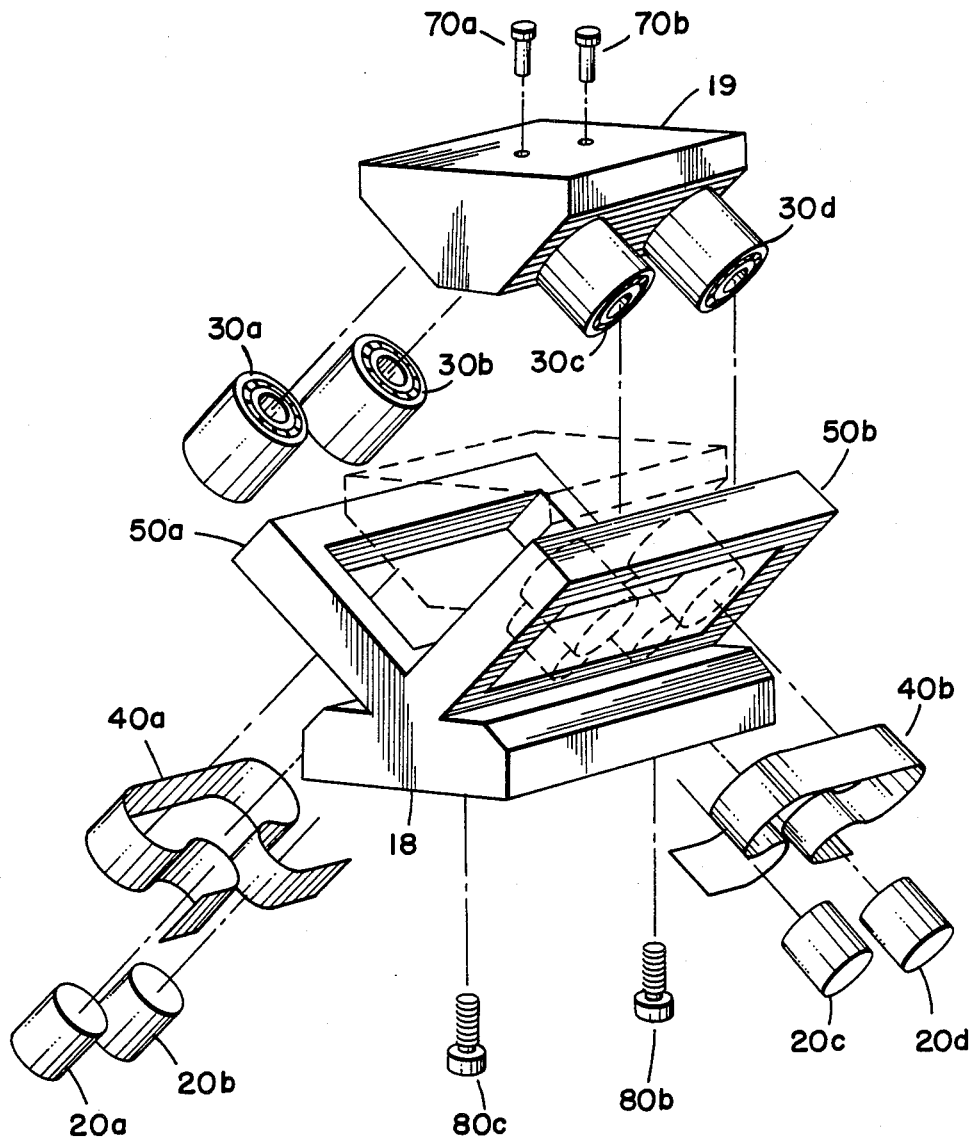
FIG. 6 is a simplified perspective drawing of a second frame associated with the linear bearing of the present invention showing the relationship of the "Y"-shaped frame to the second frame.

Referring now to FIG. 6, it can be seen that the second frame 19 rides within the space between the upper arms 50a and 50b of the "Y"-shaped frame 18. The two pairs of opposed rolamite mechanisms can be seen fitting into the openings 44a and 44b in the upper arms of the "Y"-shaped frame 18. The two flexible band means 40a and 40b hold the four pairs of solid cylindrical rollers 20a, b, c, d and annular cylindrical roller bearings 30a, b, c, d in place under the tension in the bands 40a and 40b. As shown in FIG. 5, the annular bearings 30a, b, c, d are fitted onto zero-clearance shafts 65a, b, c, d which are attached to the second frame 19.

First connecting means 70a and 70b for attaching a first mechanical asembly such as a mirror assembly are shown in FIG. 6 as two bolts which screw into threaded holes in the second frame 19 after passing through corresponding holes that clear the body diameter of the bolts in some part of the mirror assembly. Second connecting means 80a and 80b for connecting the "Y"-shaped frame 18 to a second mechanical assembly, such as the platform 13, are shown similarly as two bolts which screw into threaded holes in the frame 18 after passing through correspondingly placed holes in the platform 13.

To review the manner in which an optical component such as the mirror 11 is mounted using the linear bearings of the present invention, the linear bearings 10 each contain two sets of opposed rolamite mechanisms moving in parallel directions in the perpendicular arms 50a and 50b of the "Y"-shaped first frame 18. One of the two cylinders in each of the four Rolamite clusters is of an annular shape and accepts a roller-bearing mounted shaft therethrough, the annular cylinders being journalled for rotation up on the second frame 19 that rides within the first frame 18. The rolamite clusters move with the second frame 19. The linear bearing motion occurs between the "Y"-shaped first frame 18 and the second frame 19.

A demonstration model embodying the principles of the present invention was constructed using a glass mirror and a steel support platform. The size of the mirror was 10×15 inches. Three support points were located upon the circumference of a mounting circle having a diameter of 14 inches. Linear bearings as described herein were employed at each of the support points. The mirror and the platform were heated from room temperature (approximately 68 degrees Fahrenheit) to approximately 220 degrees Fahrenheit. The radial movement along each of the directions of free movement of the linear bearings, that is, along the extensions of the radii of the mounting circle, was measured to be approximately 0.021 inch. The mirror mount readily accommodated the differential thermal expansion without adversely affecting the structure or optical properties of the mirror.

The present invention has been described in detail with reference to a particular preferred embodiment, but persons possessing ordinary skill in the art to which this invention pertains will appreciate that various modifications may be made without departing from the spirit and scope of the invention. For example, although the particular embodiment shown in the drawings has two cylindrical rollers in each rolamite mechanism, it might be desirable in certain applications to make use of rolamite clusters of more than two cylindrical rollers. Similarly, the method shown of fixing the ends of the flexible bands such that the tension in them is adjustable is but one possible method, and persons with ordinary skill in the art will be able to arrive at other suitable arrangements. Also, it can be appreciated that the mirror 11 may be mounted to either the "Y"-shaped frame 18 or to the second frame 19. Similarly, it can be seen that the invention advantageously provides for the strain free mounting of a variety of devices, including but not limited to lasers, precision surgical devices, and a variety of other similar devices. Thus, the method and apparatus of the present invention should not be considered to be limited to the embodiment shown herein, but is instead to be limited only by the following claims.

What is claimed is:

1. A method of mounting a first mechanical assembly having a characteristic coefficient of expansion to a second mechanical assembly having a different characteristic coefficient of expansion in order to substantially eliminate the creation within the assemblies of mechanical stresses generated by a variation in ambient temperature causing an unequal expansion or contraction of one of the mechanical assemblies relative to the other, comprising the steps of:

determining a radius of a first mounting circle upon which the first mechanical assembly is to be mounted upon the second mechanical assembly;

providing a plurality of linear bearings upon the circumference of the mounting circle, each of the linear bearings having an axis of translation colinear with an extension of a radius of the mounting circle;

mounting a first connective member of each of the linear bearings to the first mechanical assembly; and mounting a second connective member of each of the linear bearings to said second mechanical assembly, wherein said first connective member is movable along said second connective member so that the first mechanical assembly is movably coupled for relative motion to the second mechanical assembly such that unequal expansion and contraction of each of the assemblies results in a linear motion along each of the linear bearings thereby substantially eliminating mechanical stresses between the two assemblies.

2. The method of claim 1 wherein the first mechanical assembly is fixedly mounted to the second mechanical assembly at a point substantially coincident with the center of the mounting circle and wherein the plurality of linear bearings are provided on the circumference of the first mounting circle for movably coupling the first mechanical assembly to the second mechanical assembly.

3. The method of claim 1 wherein the step of determining further comprises an additional step of determining the radius of one or more mounting circles concentric with the first mounting circle and wherein the first mechanical assembly is movably coupled to the second mechanical assembly by a plurality of linear bearings provided on the circumferences of the mounting circles.

4. The method of claim 2 wherein the step of determining further comprises an additional step of determining the radius of one or more mounting circles concentric with the first mounting circle and wherein the first mechanical assembly is movably coupled to the second mechanical assembly by a plurality of linear bearings provided on the circumferences of the mounting circles.

5. The method of claim 1 wherein each of the linear bearings comprises a plurality of rolamite mechanisms, the rolamite mechanisms movably coupling the first connective member of each of the linear bearings to the second connective member of each of the linear bearings.

* * * * *